United States Patent
Lopez et al.

(10) Patent No.: US 11,208,952 B2
(45) Date of Patent: Dec. 28, 2021

(54) INLET—NAI EXHAUST HOLE DEFINITION FOR REDUCED D-DUCT RESONANCE NOISE AND DILUTED EXHAUST PLUME FOR THERMAL CONTROL

(71) Applicant: ROHR, INC., Chula Vista, CA (US)

(72) Inventors: Carlos Lopez, Chula Vista, CA (US); Jose Alonso-Miralles, Chula Vista, CA (US); Richard Olaveson, Mission Viejo, CA (US); Stephen M. Erickson, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 102 days.

(21) Appl. No.: 16/026,958

(22) Filed: Jul. 3, 2018

(65) Prior Publication Data

US 2020/0011244 A1  Jan. 9, 2020

(51) Int. Cl.
*F02C 7/047* (2006.01)
*F02C 6/08* (2006.01)

(52) U.S. Cl.
CPC .............. *F02C 7/047* (2013.01); *F02C 6/08* (2013.01); *F05D 2220/323* (2013.01); *F05D 2240/12* (2013.01)

(58) Field of Classification Search
CPC . F02C 7/04; F02C 7/045; B64D 33/02; B64D 29/00; B64D 2033/0206; F02K 3/06
See application file for complete search history.

(56) References Cited

U.S. PATENT DOCUMENTS

| | | |
|---|---|---|
| 5,257,498 A | 11/1993 | Nikkanen et al. |
| 5,365,731 A | 11/1994 | Nikkanen et al. |
| 6,427,434 B2 * | 8/2002 | Porte ..................... B64D 15/04 244/134 B |
| 6,827,180 B2 | 12/2004 | Wilson |
| 7,923,668 B2 | 4/2011 | Layland et al. |
| 8,132,756 B2 | 3/2012 | Huber et al. |
| 9,938,852 B2 | 4/2018 | Lumbab et al. |
| 9,950,799 B2 | 4/2018 | Anderson et al. |
| 2016/0215700 A1 * | 7/2016 | Yu ......................... B64D 33/02 |
| 2017/0057643 A1 | 3/2017 | Frank et al. |
| 2017/0058772 A1 | 3/2017 | Frank et al. |
| 2018/0058322 A1 * | 3/2018 | Alstad .................... B64D 15/04 |

FOREIGN PATENT DOCUMENTS

| | | |
|---|---|---|
| EP | 0436243 | 7/1991 |
| EP | 0536089 | 4/1993 |
| EP | 2607655 | 6/2013 |
| EP | 3093236 | 11/2016 |

OTHER PUBLICATIONS

European Patent Office, European Search Report dated Nov. 26, 2019 in Application No. 19183406.8.

* cited by examiner

*Primary Examiner* — Ehud Gartenberg
*Assistant Examiner* — Jacek Lisowski
(74) *Attorney, Agent, or Firm* — Snell & Wilmer L.L.P.

(57) ABSTRACT

An inlet for use with a nacelle having an axis includes an outer barrel. The inlet further includes a lip skin defining a plurality of elongated exit holes including a first circumferential outer hole, a second circumferential outer hole, and a plurality of center holes located between the first circumferential outer hole and the second circumferential outer hole, the first circumferential outer hole being located at least 10 degrees of an entire circumference of the inlet away from the second circumferential outer hole.

13 Claims, 4 Drawing Sheets

INLET—NAI EXHAUST HOLE DEFINITION FOR REDUCED D-DUCT RESONANCE NOISE AND DILUTED EXHAUST PLUME FOR THERMAL CONTROL

FIELD

The present disclosure relates to nacelles and, more particularly, to exit holes located on inlets of nacelles to provide an exit path for de-icing hot gas.

BACKGROUND

Gas turbine engine systems for modern aircraft often include a nacelle. The nacelle provides various functionalities such as reducing engine noise, providing a smooth surface for airflow through and around a gas turbine engine, thrust reversing capabilities, and the like. In certain situations, ice is capable of forming on nacelles. For example, in response to moisture being present at relatively high altitudes, ice may form on or in the inlet of the nacelle. In that regard, inlets of nacelles may be designed to include a de-icing system that uses hot bleed air from the gas turbine engine to heat the leading edge (nose-lip) of the inlet to reduce or eliminate such ice formation. Exit holes are provided for an exit path for the spent anti-icing hot air flow.

SUMMARY

Disclosed herein is an inlet for use with a nacelle having an axis. The inlet includes an outer barrel. The inlet further includes a lip skin defining a plurality of elongated exit holes including a first circumferential outer hole, a second circumferential outer hole, and a plurality of center holes located between the first circumferential outer hole and the second circumferential outer hole, the first circumferential outer hole being located at least 10 degrees of an entire circumference of the inlet away from the second circumferential outer hole.

In any of the foregoing embodiments, the first circumferential outer hole is located at least 15 degrees of the entire circumference of the inlet away from the second circumferential outer hole.

In any of the foregoing embodiments, the plurality of elongated exit holes face radially outward.

In any of the foregoing embodiments, each of the plurality of elongated exit holes has a first dimension measured in a direction parallel to the axis and a circumferential dimension measured in a circumferential direction of the inlet.

In any of the foregoing embodiments, the axial dimension is at least three times the size of the circumferential dimension.

In any of the foregoing embodiments, each of the plurality of elongated exit holes has a rounded, elongated shape.

In any of the foregoing embodiments, the plurality of elongated exit holes are non-uniformly distributed about a portion of the lip skin.

In any of the foregoing embodiments, each of the plurality of elongated exit holes is configured to port spent gas from the inlet.

In any of the foregoing embodiments, the plurality of center holes includes: a first circumferential inner hole located adjacent to the first circumferential outer hole, a second circumferential inner hole located adjacent to the second circumferential outer hole, and a plurality of middle holes located between the first circumferential inner hole and the second circumferential inner hole; an outer distance exists between the first circumferential outer hole and the first circumferential inner hole, and a similar outer distance exists between the second circumferential outer hole and the second circumferential inner hole; and an inner distance between each of the plurality of middle holes is less than the outer distance.

In any of the foregoing embodiments, a middle distance exists between the first circumferential inner hole and the plurality of middle holes and is greater than the inner distance.

Also disclosed is an inlet for use with a nacelle having an axis. The inlet includes an outer barrel. The inlet further includes a lip skin defining a plurality of elongated exit holes including a first circumferential outer hole, a second circumferential outer hole, and a plurality of center holes located between the first circumferential outer hole and the second circumferential outer hole, the first circumferential outer hole being located at least 10 degrees of an entire circumference of the inlet away from the second circumferential outer hole, and each of the plurality of elongated exit holes having an axial dimension that is greater than a circumferential dimension.

In any of the foregoing embodiments, the first circumferential outer hole is located at least 15 degrees of the entire circumference of the inlet away from the second circumferential outer hole.

In any of the foregoing embodiments, the plurality of elongated exit holes face radially outward.

In any of the foregoing embodiments, the axial dimension is at least two times a size of the circumferential dimension.

In any of the foregoing embodiments, each of the plurality of elongated exit holes has a rounded elongated shape.

In any of the foregoing embodiments, the plurality of elongated exit holes are non-uniformly distributed about a portion of the lip skin.

In any of the foregoing embodiments, the plurality of center holes includes: a first circumferential inner hole located adjacent to the first circumferential outer hole, a second circumferential inner hole located adjacent to the second circumferential outer hole, and a plurality of middle holes located between the first circumferential inner hole and the second circumferential inner hole; an outer distance exists between the first circumferential outer hole and the first circumferential inner hole, and a similar outer distance exists between the second circumferential outer hole and the second circumferential inner hole; and an inner distance between each of the plurality of middle holes is less than the outer distance.

Also disclosed is a nacelle for use with a gas turbine engine. The nacelle includes a fan cowl. The nacelle further includes a thrust reverser. The nacelle further includes an inlet. The inlet includes an outer barrel. The inlet further includes a lip skin defining a plurality of elongated exit holes including a first circumferential outer hole, a second circumferential outer hole, and a plurality of center holes located between the first circumferential outer hole and the second circumferential outer hole, the first circumferential outer hole being located at least 10 degrees of an entire circumference of the inlet away from the second circumferential outer hole.

In any of the foregoing embodiments, the first circumferential outer hole is located at least 15 degrees of the entire circumference of the inlet away from the second circumferential outer hole.

In any of the foregoing embodiments, each of the plurality of elongated exit holes has an axial dimension and a circumferential dimension, the axial dimension being at least two times a size of the circumferential dimension.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
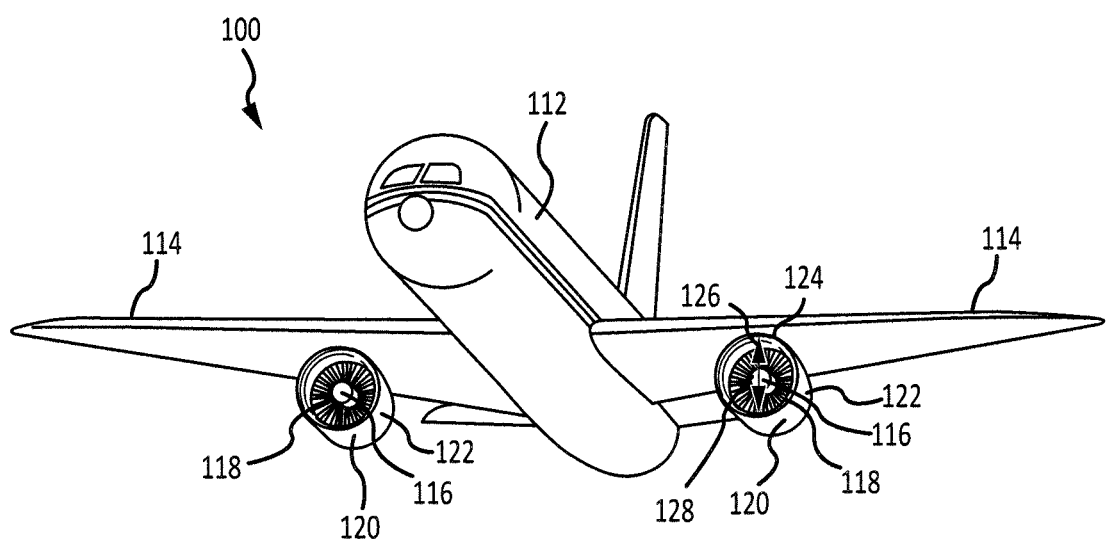
FIG. 1 illustrates a perspective view of an aircraft in accordance with various embodiments.

In various embodiments and with reference to FIG. 1, an aircraft 100 may comprise a fuselage 112 and a pair of wings 114. A propulsion system 120 (e.g., a turbofan gas turbine engine with a nacelle assembly) may be coupled to the aircraft 100 (e.g., mounted on the underside of a wing 114). The propulsion system 120 may be configured to provide at least one of forward thrust or propulsion for the aircraft 100.

Figure 2:
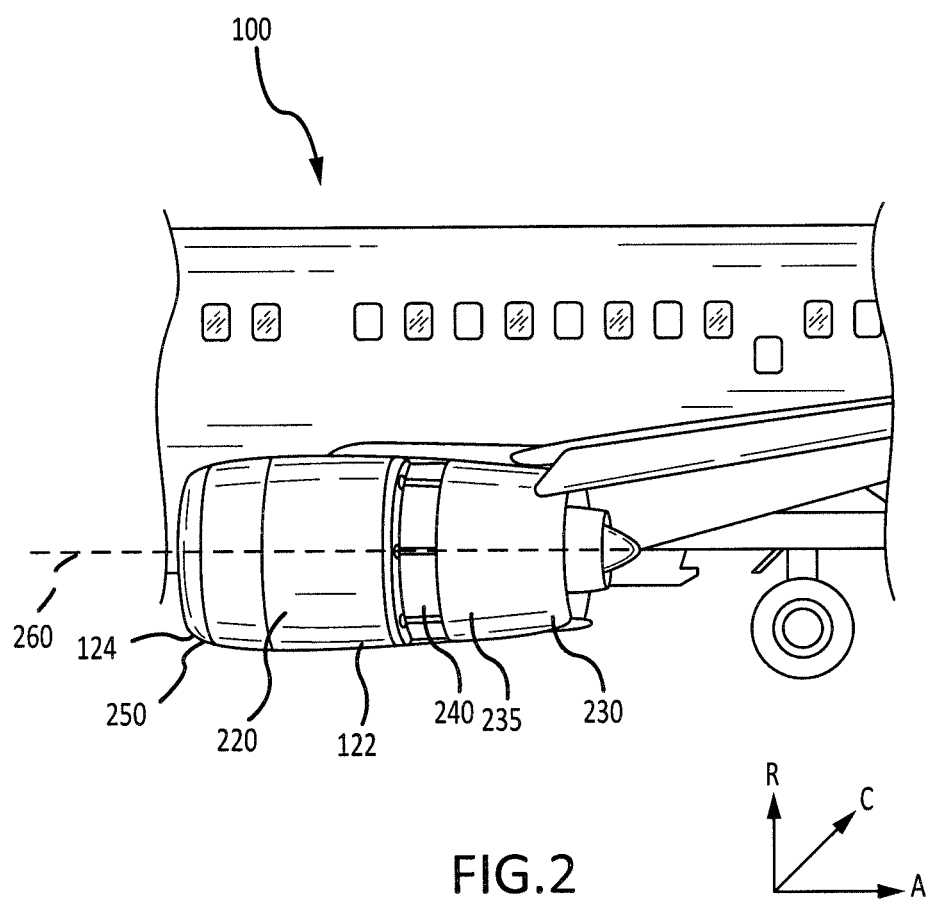
FIG. 2 illustrates a side view of the aircraft of FIG. 1 including a nacelle in accordance with various embodiments.

In various embodiments, the propulsion system 120 may comprise an engine including a fan 118 and an engine core 116, housed within a nacelle assembly 122. With reference to FIGS. 1 and 2, the typical nacelle assembly, or more simply a nacelle assembly 122, may comprise an inlet 124, a fan cowl 220, a thrust reverser 235, and an exhaust system. The nacelle assembly 122 surrounds the engine core 116 providing smooth aerodynamic surfaces for airflow around and into the engine. The nacelle also helps define a bypass air duct through the propulsion system 120.

The inlet 124 has a center 128 and a diameter 126 that extends through the center. The diameter of the inlet 124 may be, for example, between 60 inches (1.52 meters (m)) and 120 inches (3 m), between 70 inches (1.8 m) and 90 inches (2.3 m), or about 80 inches (2.0 m).

In various embodiments, the fan 118 may draw and direct a flow of air into and through the propulsion system 120. After the fan 118, the air is divided into two principal flow paths, one flow path through engine core 116 (i.e., a "core airflow"), and another flow path through a bypass air duct (i.e., a "bypass airflow"). The engine core flow path is directed into the engine core 116 and initially passes through a compressor that increases the air flow pressure, and then through a combustor where the air is mixed with fuel and ignited. The combustion of the fuel and air mixture causes a series of turbine blades at the rear of the engine core 116 to rotate, and to drive the engine's compressor and fan 118. The high-pressure exhaust gases from the combustion of the fuel and air mixture are thereafter directed through an exhaust system aft of the engine for thrust.

In various embodiments and with reference to FIG. 2, a thrust reverser system 235 of the aircraft 100 may be included in the nacelle assembly 122 and may include a translating sleeve 230 and a cascade, or cascade array, 240. The nacelle assembly 122 may include an axis 260. The thrust reverser system 235 may also comprise an air diversion system that is configured to direct airflow in the bypass duct through the cascade to create reverse thrust. The air diversion system may be any suitable system including, for example, blocker doors, diversion doors, and/or the like. An A-R-C axis as shown in various drawings to illustrate the axial, radial, and circumferential directions, respectively.

Figure 3:
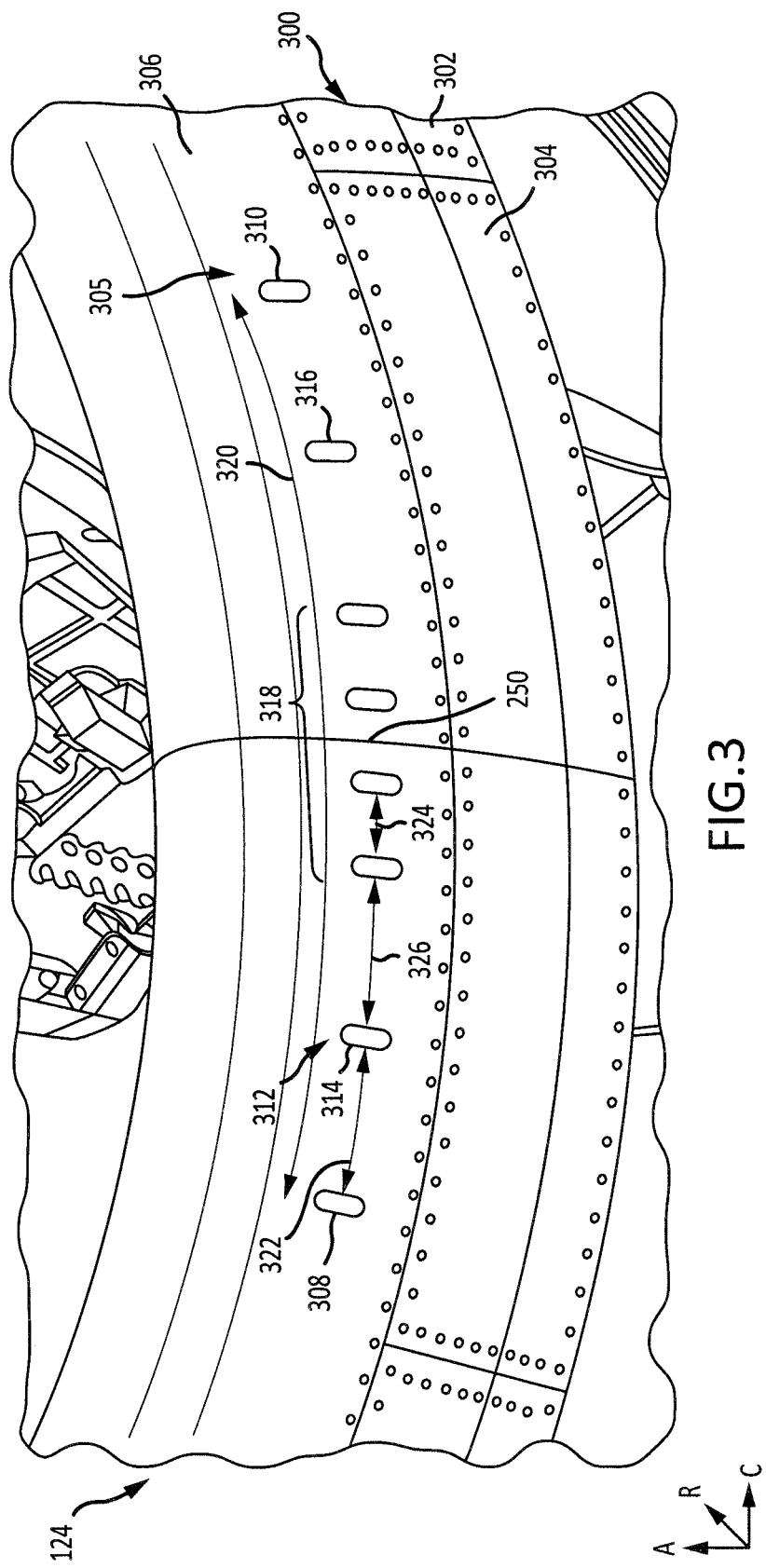
FIG. 3 illustrates a perspective view of a portion of an inlet of the nacelle of FIG. 2 including an outer barrel and a lip skin that defines a plurality of exit holes in accordance with various embodiments.

Referring to FIG. 3, the inlet 124 may include an outer barrel 300 and a lip skin 306. The outer barrel 300 may include a plurality of composite panels 302 which included a composite material, such as a carbon fiber and epoxy. The outer barrel 300 may further include a plurality of metal panels 304 which may include a metal material, such as aluminum or steel.

Referring to FIGS. 2 and 3, the inlet 124 may have a bottom 250. The bottom 250 may be the portion of the inlet 124 that is nearest to a ground surface in response to the aircraft 100 being at rest on the ground surface.

The lip skin 306 may define a plurality of elongated exit holes 305 that are centered around the bottom 250 of the inlet 124. The plurality of exit holes 305 may include a first circumferential outer hole 308, a second circumferential outer hole 310, and a plurality of center holes 312 oriented circumferentially between the first circumferential outer hole 308 and the second circumferential outer hole 310.

The plurality of exit holes 305 may face radially outward. Stated differently, the plurality of exit holes 305 may face away from the center 128 of the inlet 124 as shown in FIG. 1.

The plurality of center holes 312 may include a first circumferential inner hole 314 located adjacent to the first circumferential outer hole 308, a second circumferential inner hole 316 located adjacent to the second circumferential outer hole 310, and a plurality of middle holes 318. In various embodiments, the plurality of middle holes 318 may include four middle holes 318. In that regard and in various embodiments, the plurality of elongated exit holes 305 may include eight exit holes.

Heated gas from the core 116 of the gas turbine engine of FIG. 1 may flow through a portion of the nacelle assembly 122 to reduce the likelihood of ice forming on the nacelle assembly 122. For example, a ducting system may provide engine hot bleed air to the inlet 124 to reduce the likelihood of ice forming on the inlet 124. Each of the plurality of exit holes 305 may provide a path for the heated gas to exit the nacelle assembly 122. In that regard, the plurality of exit holes 305 may port the heated gas out of the nacelle assembly 122.

The outer barrel 300 may include the metal panels 304 proximate to the plurality of exit holes 305 due to the heat produced through the exit holes 305. These panels may include metal because metal is more resistant to heat damage (such as de-lamination, blistering, softening, embrittlement, paint blistering, discoloration, etc.) than many composite materials. The locations of the inlet 124 that are distal relative to the elongated exit holes 305 are exposed to lower temperatures than the metal panels 304 and may thus include composite materials.

As described above, the plurality of elongated exit holes 305 may extend about a portion of a circumference of the inlet 124. In particular, the plurality of elongated exit holes 305 may extend for an angular distance 320 about the circumference of the inlet 124. Stated differently, the angular distance 320 may extend from the first circumferential outer hole 308 to the second circumferential outer hole 310. The angular distance 320 may be between 5 degrees and 30 degrees of the entire circumference of the inlet 124, between 10 degrees and 20 degrees of the entire circumference of the inlet 124, or about 15 degrees of the entire circumference of the inlet 124. Where used in this context, the term "about" refers to the stated value plus or minus five percent of the stated value.

Because the angular distance 320 is relatively large, the hot exhaust from the elongated exit holes 305 may mix more quickly with oncoming ambient air to reduce heating of the nacelle assembly 122 in order to keep the nacelle assembly 122 at a lower temperature.

Additionally, the plurality of elongated exit holes 305 may be non-uniformly distributed about a portion of the lip skin 306. Such non-uniform distribution of the elongated exit holes 305 may provide advantages such as reduced noise, increased mixing with ambient air, or the like.

An outer distance 322 may exist between the first circumferential outer hole 308 and the first circumferential inner hole 314. A similar distance may extend between the second circumferential outer hole 310 and the second circumferential inner hole 316. A middle distance 326 may extend between the first circumferential inner hole 314 and the middle holes 318. An inner distance 324 may extend between each of the middle holes 318.

In various embodiments, the outer distance 322 may be greater than or equal to the inner distance 324. In various embodiments, the outer distance 322 may be greater than or equal to the middle distance 326. In various embodiments, the middle distance 326 may be greater than or equal to the inner distance 324. In various embodiments, the outer distance 322, the middle distance 326, and the inner distance 324 may be the same.

Figure 4:
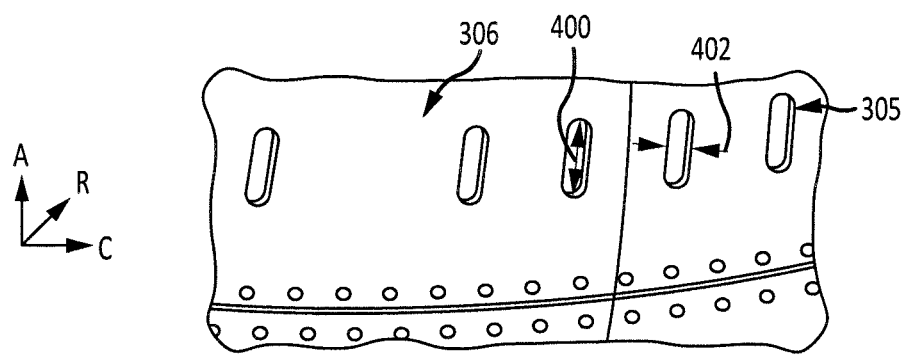
FIG. 4 illustrates close up view of a portion of the lip skin of FIG. 3 in accordance with various embodiments.

Turning now to FIG. 4, an enlarged view of the lip skin 306 illustrates various features of the plurality of elongated exit holes 305. In particular, the elongated exit holes 305 have an axial distance or dimension 400 and a circumferential distance or dimension 402.

In various embodiments, the axial distance 400 may be between 1 inch (25.4 millimeters (mm)) and 3 inches (76.2 mm), between 1.5 inches (38.1 mm) and 2.5 inches (63.5 mm), or about 2.06 inches (52.3 mm).

In various embodiments, the circumferential distance 402 may be between 0.2 inches (5.1 mm) and 1 inch (25.4 mm), between 0.3 inches (7.6 mm) and 0.8 inches (20 mm), or about 0.56 inches (14.2 mm).

In various embodiments, a ratio of the axial distance 400 to the circumferential distance 402 may be greater than 2, may be greater than 3, or may be greater than 3.5.

The plurality of elongated exit holes 305 may have rounded corners.

The elongated, rounded design of the elongated exit holes 305 provides advantages. For example, as air flows over circular exit holes, an undesirable "whistling" noise may be heard. Use of the elongated exit holes 305 having the rounded shape reduces or eliminates such undesirable noise.

In some embodiments, other variations of exit holes may be used to achieve the benefits provided by the elongated exit holes 305 (including reduction in the undesirable noise and optimized air flow mixing). For example, a different quantity of exit holes may be used. As another example, these benefits may be achieved by using a different, non-uniform spacing of exit holes. As yet another example, these benefits may be achieved by using different shaped exit holes 305. For example, such exit holes may be elongated in different directions, may have a circular cross section, may have a rectangular cross section, may have a triangular cross section, may have a teardrop shape, or the like.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inlet for use with a nacelle having an axis, comprising:
    an outer barrel; and
    a lip skin defining a plurality of elongated exit holes including a first circumferential outer hole, a second circumferential outer hole, and a plurality of center holes located between the first circumferential outer hole and the second circumferential outer hole, the first circumferential outer hole being located between 5 degrees and 30 degrees of an entire circumference of the inlet away from the second circumferential outer hole, and each of the plurality of elongated exit holes having a rounded shape, a first dimension measured in a direction parallel to the axis, and a circumferential dimension measured in a circumferential direction of the inlet such that the first dimension of each of the plurality of elongated exit holes is at least three times a size of the circumferential dimension, wherein:
        the plurality of center holes includes:
            a first circumferential inner hole located adjacent to the first circumferential outer hole, the first circumferential inner hole spaced apart from the first circumferential outer hole by an outer distance,
            a second circumferential inner hole located adjacent to the second circumferential outer hole, the second circumferential inner hole spaced apart from the second circumferential outer hole by the outer distance,
            a first pair of middle holes located between the first circumferential inner hole and the second circumferential inner hole, the first pair of middle holes spaced apart by an inner distance, and
            a second pair of middle holes located between the first circumferential inner hole and the second circumferential inner hole, the second pair of middle holes spaced apart by the inner distance, the outer distance being greater than the inner distance.

2. The inlet of claim 1, wherein the first circumferential outer hole is located at least 15 degrees of the entire circumference of the inlet away from the second circumferential outer hole.

3. The inlet of claim 1, wherein the plurality of elongated exit holes face radially outward.

4. The inlet of claim 1, wherein the plurality of elongated exit holes are non-uniformly distributed about a portion of the lip skin.

5. The inlet of claim 1, wherein each of the plurality of elongated exit holes is configured to port spent gas from the inlet.

6. The inlet of claim 1, wherein a middle distance exists between the first circumferential inner hole and a first hole in the first pair of middle holes and is greater than the inner distance.

7. An inlet for use with a nacelle having an axis, comprising:
    an outer barrel; and
    a lip skin defining a plurality of elongated exit holes including a first circumferential outer hole, a second circumferential outer hole, and a plurality of center holes located between the first circumferential outer hole and the second circumferential outer hole, the first circumferential outer hole being located between 5 degrees and 30 degrees of an entire circumference of the inlet away from the second circumferential outer hole, and each of the plurality of elongated exit holes having an elongated shape with rounded edges, wherein:
        the plurality of center holes includes:
            a first circumferential inner hole located adjacent to the first circumferential outer hole, the first circumferential inner hole spaced apart from the first circumferential outer hole by an outer distance,
            a second circumferential inner hole located adjacent to the second circumferential outer hole, the second circumferential inner hole spaced apart from the second circumferential outer hole by the outer distance,
            a first pair of middle holes located between the first circumferential inner hole and the second circumferential inner hole, the first pair of middle holes spaced apart by an inner distance, and
            a second pair of middle holes located between the first circumferential inner hole and the second circumferential inner hole, the second pair of middle holes spaced apart by the inner distance, the outer distance being greater than the inner distance.

8. The inlet of claim 7, wherein the first circumferential outer hole is located at least 15 degrees of the entire circumference of the inlet away from the second circumferential outer hole.

9. The inlet of claim 7, wherein the plurality of elongated exit holes face radially outward.

10. The inlet of claim 7, wherein an axial dimension of each of the plurality of elongated exit holes is at least two times a size of a circumferential dimension.

11. The inlet of claim 7, wherein the plurality of elongated exit holes are non-uniformly distributed about a portion of the lip skin.

12. A nacelle for use with a gas turbine engine, the nacelle defining an axis, the nacelle comprising:
    a fan cowl;
    a thrust reverser; and
    an inlet having:
        an outer barrel, and
        a lip skin defining a plurality of elongated exit holes including a first circumferential outer hole, a second circumferential outer hole, and a plurality of center holes located between the first circumferential outer hole and the second circumferential outer hole, the first circumferential outer hole being located between 5 degrees and 30 degrees of an entire circumference of the inlet away from the second circumferential outer hole, and each of the plurality of elongated exit holes having a rounded shape, a first dimension measured in a direction parallel to the axis, and a circumferential dimension measured in a circumferential direction of the inlet such that the first dimension of each of the plurality of elongated exit holes is at least three times a size of the circumferential dimension, wherein:

the plurality of center holes includes:
- a first circumferential inner hole located adjacent to the first circumferential outer hole, the first circumferential inner hole spaced apart from the first circumferential outer hole by an outer distance,
- a second circumferential inner hole located adjacent to the second circumferential outer hole, the second circumferential inner hole spaced apart from the second circumferential outer hole by the outer distance,
- a first pair of middle holes located between the first circumferential inner hole and the second circumferential inner hole, the first pair of middle holes spaced apart by an inner distance, and
- a second pair of middle holes located between the first circumferential inner hole and the second circumferential inner hole, the second pair of middle holes spaced apart by the inner distance, the outer distance being greater than the inner distance.

13. The nacelle of claim 12, wherein the first circumferential outer hole is located at least 15 degrees of the entire circumference of the inlet away from the second circumferential outer hole.

\* \* \* \* \*